United States Patent [19]
Gilliam

[11] 3,792,562
[45] Feb. 19, 1974

[54] METHOD OF PACKAGING GROUPED ARTICLES

[75] Inventor: Scott W. Gilliam, Rush, N.Y.

[73] Assignee: Container Corporation of America, Chicago, Ill.

[22] Filed: Jan. 10, 1972

[21] Appl. No.: 216,355

Related U.S. Application Data
[62] Division of Ser. No. 8,505, Feb. 9, 1970, abandoned.

[52] U.S. Cl............................ 53/30, 53/48, 156/86, 264/342 R
[51] Int. Cl............................................. B65b 53/02
[58] Field of Search......... 264/230, 342 R, DIG. 71; 53/26, 30, 48, 29, 184, 140; 83/1, 54; 156/86, 197, 201, 229, 250, 462, 516, 523; 294/87.2; 425/289, 306, 307

[56] References Cited
UNITED STATES PATENTS

| | | | |
|---|---|---|---|
| 2,848,132 | 8/1958 | Davous | 156/197 X |
| 3,044,230 | 7/1962 | Fisher | 53/48 X |
| 3,286,835 | 11/1966 | Crane | 53/30 X |

*Primary Examiner*—Robert L. Spruill
*Attorney, Agent, or Firm*—Carpenter, Ostis & Lindberg

[57] ABSTRACT

A method of forming a carrier from resinous material consisting of conjugated tube-like elements preferably arranged to hold a group of containers such as bottles, cans or the like. The material forming the carrier is preferably from those having memory characteristics, and after the tube-like elements are placed in position around a container group, they undergo a step to cause them to engage the individual containers to provide a container package with the containers unitarily arranged.

7 Claims, 18 Drawing Figures

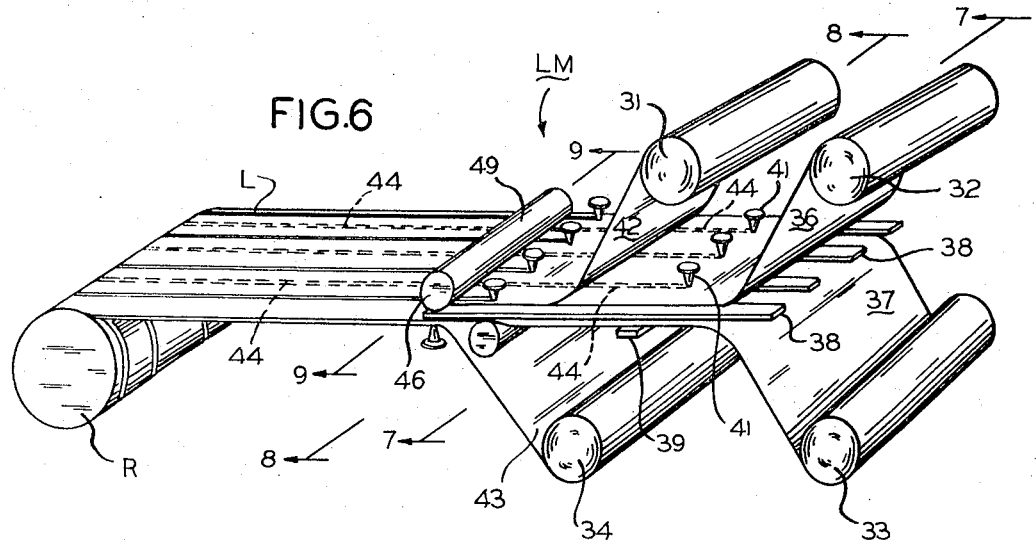
FIG.6
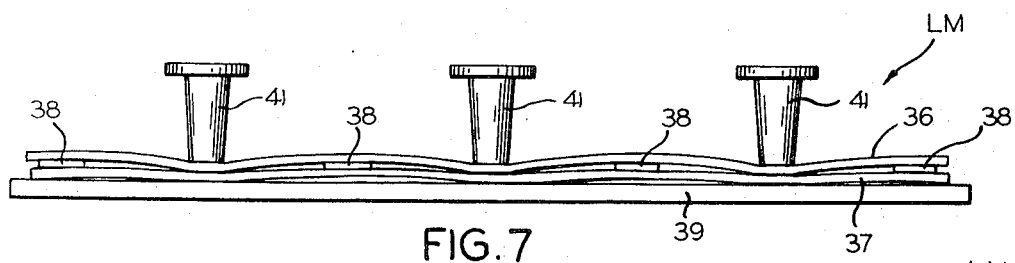
FIG.7
FIG.8
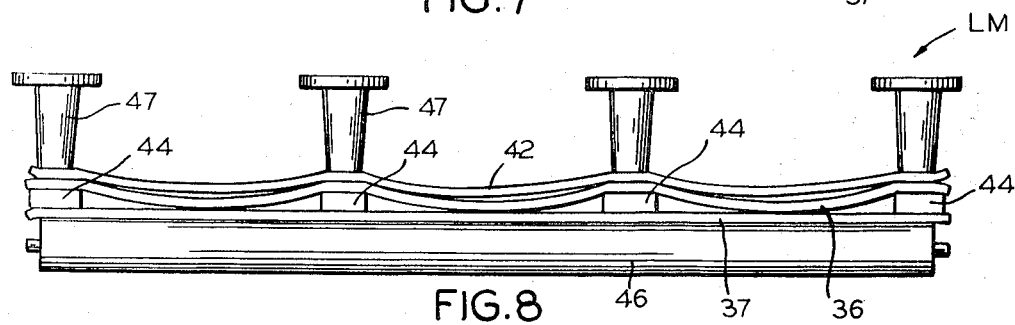
FIG.9

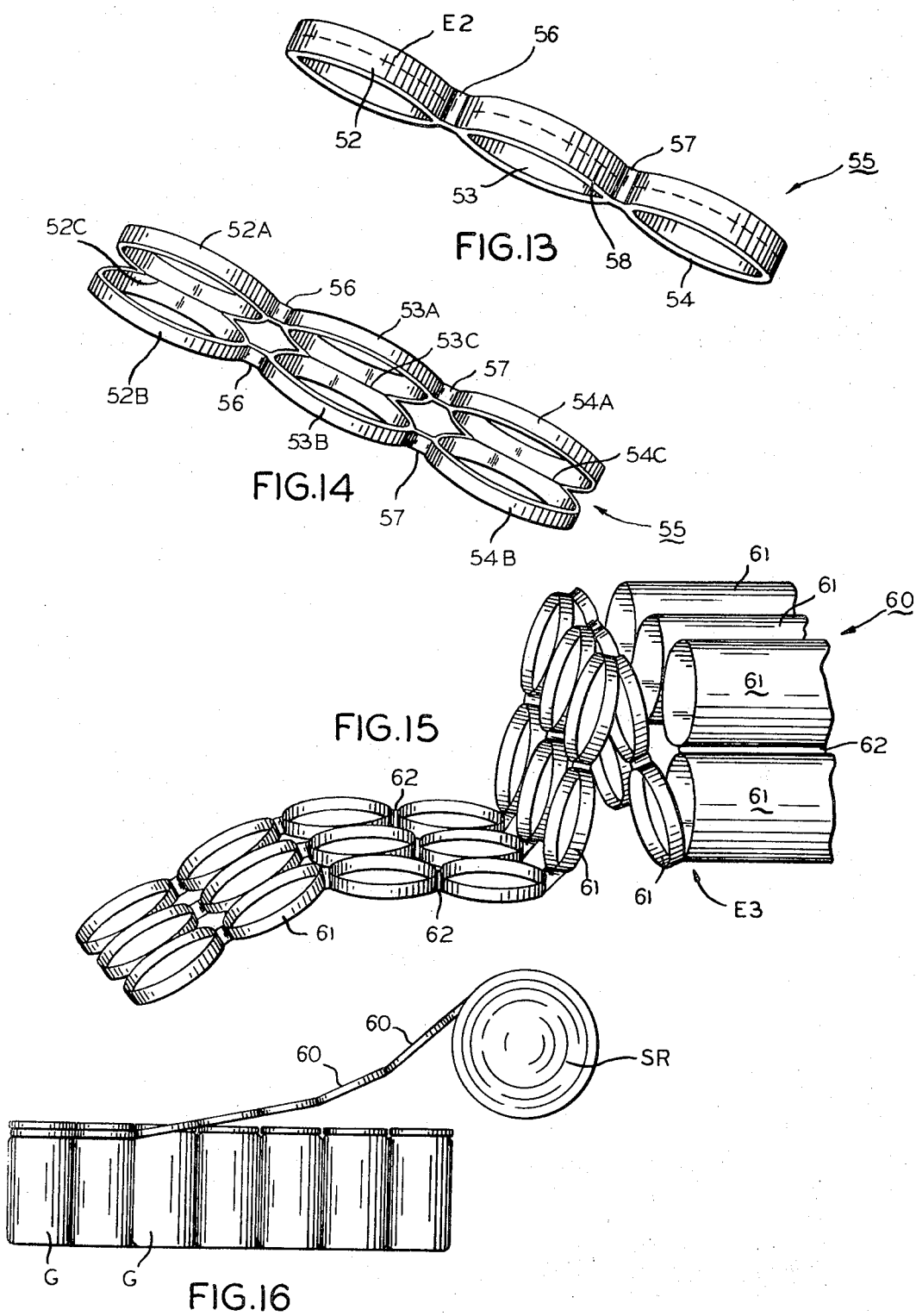

3,792,562

METHOD OF PACKAGING GROUPED ARTICLES

CROSS REFERENCE TO RELATED APPLICATION

This is a division of my co-pending patent application, Ser. No. 8,505, filed Feb. 9, 1970 and now abandoned.

BACKGROUND OF THE INVENTION

1. Field of the Invention

This invention relates to an article carrier formed from a resinous material having memory characteristics. More particularly, it relates to a carrier consisting of a plurality of conjugately arranged tube-like elements which are adapted to be snugly fit about a group of containers arranged in a predetermined relationship. The tube-like elements may be formed in an extruding operation in one form of the invention, and in another form thereof they may be formed by sealing a plurality of laminae along lines of contact extending longitudinally thereof.

In another embodiment of the invention, the carrier is formed from a short length consisting of conjugately connected tubes. These are partly severed transversely so as to provide a double row of conjugately arranged tube-like elements adapted to be placed over a group of containers and fitted around each of the containers of the group.

2. The Prior Art

In the packaging of beverages, in the six-pack form, it has been the practice to form a carrier from a web of a resinous material having memory characteristics. The web is provided with apertures through which a container extends to be supported. After the apertured web is placed over the container group, the memory characteristics of the resinous material causes the web to tightly engage about the individual containers.

SUMMARY OF THE INVENTION

The carriers according to the present invention consist of conjugate tube-like elements having a axial extent which is considerably greater than the thickness of the materials forming the carrier, the tube-like elements being formed from either a number of laminae adhered together in a special manner or by an extrusion consisting of tube members conjugately connected and subsequently severed transversely to form a carrier consisting of a plurality of tube-like members arranged in conjugate relationship.

THE DRAWINGS

FIG. 6 is an isometric view of apparatus for acting upon a number of laminae to form a carrier according to a second embodiment of the invention;

FIG. 7 is a section along the line 7—7 of FIG. 6 looking in the direction of the arrows;

FIG. 8 is a section taken along the line 8—8 of FIG. 6 looking in the direction of the arrows;

FIG. 9 is a section taken along line 9—9 of FIG. 6 looking in the direction of the arrows;

FIG. 13 is a perspective view showing the manner in which an extrusion comprised of three conjugately connected tubes may be partly severed transversely to form a carrier according to still another embodiment;

FIG. 14 is a view similar to FIG. 13 showing the completion of the transverse severing operation;

FIG. 15 is a view showing the manner in which an extrusion comprised of six conjugately connected tubes may be transversely severed in an operation to form a plurality of connected carriers;

FIG. 16 shows the carrier in which the connected carriers of FIG. 15 may be placed in position with respect to container groups;

Figure 1:
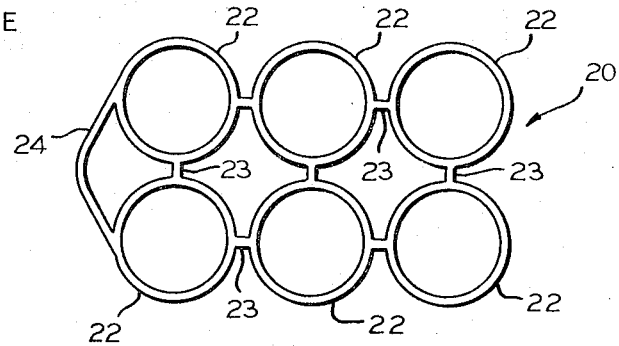
FIG. 1 is a plan view of a carrier constructed in accordance with one embodiment of the invention.

The improved carrier according to a first embodiment of the invention is referred to generally by the reference numeral 20 and is preferably formed by an extruding operation in an extruding die 21. The carrier 20 is comprised of a group of conjugately connected tube-like elements 22, each being connected to a contiguous one of such elements by a web 23. As seen in FIG. 1 a sling 24 connects at each end to a pair of endmost elements 22.

Figure 2:
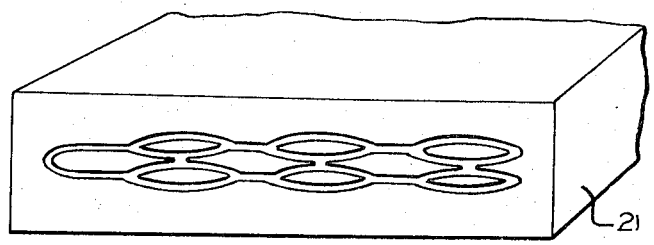
FIG. 2 is an isometric schematic view of an extrusion die for forming the carrier of FIG. 1.
Figure 3:
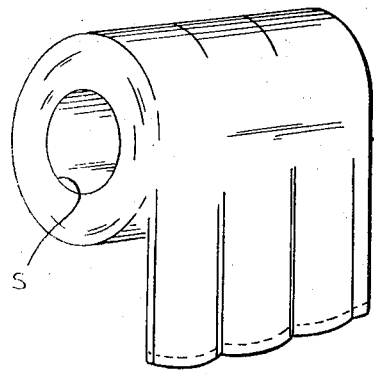
FIG. 3 is an isometric view of the extrusion formed in the die of FIG. 2, and showing the same wound upon a storage roll.

The extrusion die 21 seen in FIG. 22 is arranged to form an extrusion E consisting of the elements seen in FIG. 1, and as the extrusion E emerges from the extrusion die 21, the same is stretched longitudinally and wound about a support spool S seen in FIG. 3.

The extrusion E is made of a resinous material having certain memory characteristics and preferably of a type that when strained below its plastic limit it will revert to its size and shape before having been strained. Examples of such materials are linear polyamides, (sometimes referred to by the trade name "Saran"); polymers formed from unsaturated hydrocarbon of the olefin series, such as polyethylene and polypropylene; resins of poly vinylbenzene series (sometimes referred to as "Styrene") and substitution resins of the polyvinylbenzene series such as polyvinylbutyrate and polyvinylacetate. It is possible that other resins may be employed to form the extrusion E as seen in FIG. 3, provided the same have memory characteristics.

Figure 5:
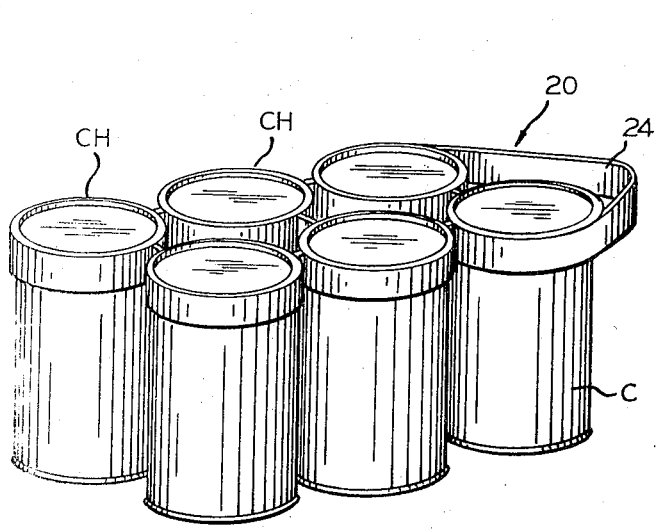
FIG. 5 is a perspective view of the carrier in position on a group of containers.
Figure 4:
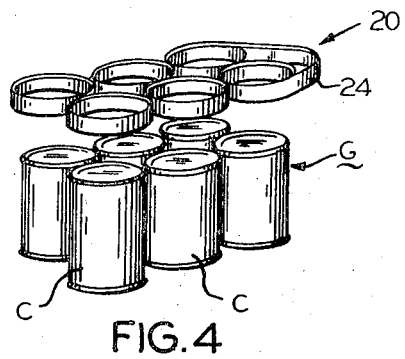
FIG. 4 is a perspective view showing the manner in which the carrier of FIG. 1 is placed about a group of containers.

Irrespective of the type of resin employed in making the extrusion E, the dimension of the tube-like elements 22 thereof is such that they may be moved into place with respect to a group G of beer cans or like containers. After the carrier 20 is placed into position as seen in FIG. 5, the same can be subjected to a step whereby it is heated to cause the same to shrink about the sides of the containers C. Preferably, the carrier 20 is placed in position immediately subjacent to the upper chimes of the containers C. After the shrinking operation, each container C is tightly engaged within a tube-like element 22, and the containers of the group are thus conjugately located with respect to each other.

Referring now to FIG. 6 to 12 inclusive of the drawings there is shown another embodiment of a carrier, referred to by the reference numeral 30. The same is formed from a plurality of lamina adhered together to provide a continuous length L which is severed into discrete lengths to provide the carrier 30.

As seen in FIG. 6, carrier 30 is formed in a laminating machine LM which acts upon rolls of laminae 31, 32, 33, and 34. Rolls 32 and 33 deliver therefrom respectively laminae 36 and 37. Lamina 36 moves longitudinally over anvil members 38, while lamina 37 moves beneath anvil members 38 and over a transversely extending anvil 39. A plurality of heating members 41 cooperate with the anvil 39 to cause the laminae 36 and 37 to be adhered together along a longitudinally extending line of contact as seen more clearly in FIG. 7.

The laminar material seen in FIG. 6 not only possesses the requisite memory characteristics, but should also be capable of being glued in the manner as described with respect to FIGS. 6 and 7. Following the operation described in FIG. 7, the two laminae 36 and 37 have superimposed thereon an additional lamina 42 fed from the roll 31, and disposed therebelow an infradisposed lamina 43 fed from roll 34 as seen in FIGS. 8 and 9. Superimposed lamina 42 is supported on lamina 36, lamina 37 passing beneath a plurality of longitudinally extending anvil members 44 and over transversely extending anvil 46. A plurality of heating members 47 are vertically aligned with the longitudinally extending anvil members 44 and cause uppermost lamina 42 to be adhered to lamina 36.

At the conclusion of the above adhering operation, lowermost lamina 43 is fed beneath lamina 37 and over a plurality of heater elements 48 to cause lamina 43 to be adhered to lamina 37 along a line which is vertically aligned with the line of adherence of lamina 36 to lamina 42.

A top roller 49 presses lamina 42 tightly against lamina 37, these being pressed between roll 49 and longitudinally extending anvil members 38. In like fashion pressure and heat is applied to the longitudinally extending anvil members 38 and the heaters 48.

At the conclusion of the laminating operation described, the conjugately connected tubes are wound upon a reel R seen in FIG. 6.

Figure 11:
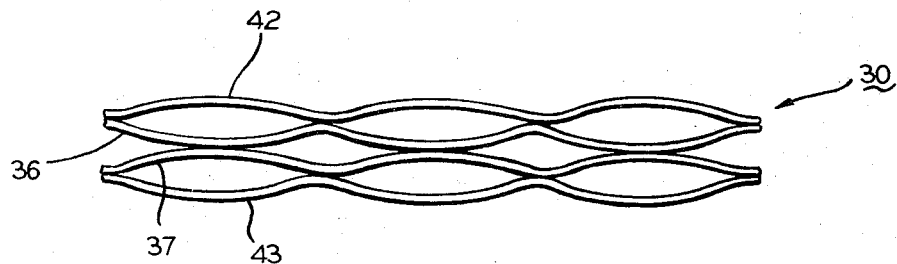
FIG. 11 is an enlarged end view of the carrier seen in FIG. 10.
Figure 12:
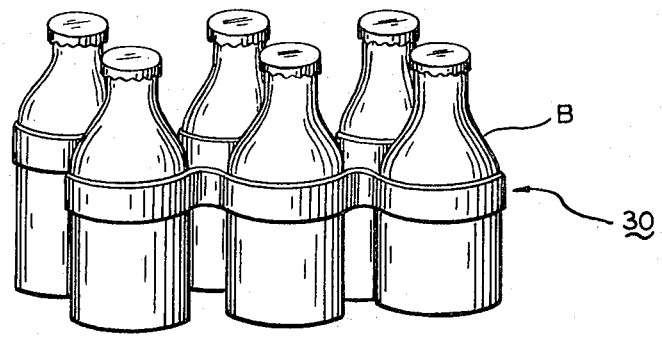
FIG. 12 is a perspective view showing the carrier of FIGS. 10 and 11 in position about a group of containers.
Figure 10:
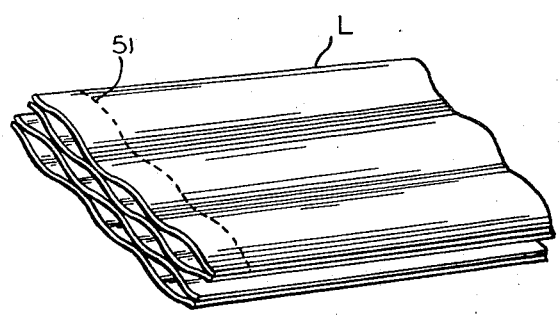
FIG. 10 is a perspective view showing a length of laminae formed in the apparatus of FIG. 6 and ready to be formed into a carrier according to the second embodiment.

The length L of the laminae as seen in FIG. 10 is transversely severed along a line 51 to provide the carrier 30 seen in FIG. 11 comprised of the laminae 42, 36, 37, and 43 in the order named. Prior to placing same about the containers B the laminae are formed so as to be essentially circular, whereby the carrier may be moved into position around container B seen in FIG. 12. In so doing, the group can be heated to cause the carrier 30 to fit snugly thereabout.

Referring now to FIGS. 13 and 14, there is shown another embodiment referred to by reference numeral 55 formed preferably in an extrusion die, not shown, to provide an extrusion $E_2$ comprised of three essentially cylindrical tubes 52, 53 and 54, tube 52 being connected to tube 53 by a web 56, and tube 53 being connected to tube 54 by a web 57.

A length of the extrusion $E_2$ seen in FIGS. 13 and 14 is severed along a transverse line 58 to form tube-like elements 52A, 52B, 53A, 54A and 54B. The cut line 58 severing the extrusion length $E_2$ is effective to the extent maintaining the tube-like elements additionally connected at what may be considered webs 52C, 53C and 54C.

Carrier 55 is substantially like carriers 20 and 30 previously described being formed of tube-like elements conjugately connected. As with the previous embodiments this one has the tube-like elements thereof placed about the containers, and can be later shrunk about the containers.

In FIGS. 15 and 16 there is shown another embodiment referred to by the reference numeral 60. In this form a carrier is formed from an extrusion $E_3$ of a material having memory characteristics. Extrusion $E_3$ is preferably stretched after being formed, as with extrusion E seen in FIG. 1, It is also comprised of the same number of conjugately connected tubes 61 connected by short webs 62, and appears identical to the form seen in FIG. 1 except for the absence of sling 24.

The extrusion $E_3$ is transversely severed to provide a connected group of carriers hinged together and adapted to be unfolded much in the fashion of extending an accordion fold. The extrusion $E_3$ is severed in such a fashion as alternately to leave connecting webs along the bottom elements of the bottom tubes 61 and the top elements of the top most tubes 61.

The unfolded groups of carriers 60 may be wound upon a supply reel SR and fed therefrom to container groups G seen in FIG. 16. Or the unfolded groups of carriers may be fed directly to such groups for placement thereon. In either case the groups are subsequently processed to cause the tube-like elements to fit snugly about the sides of the containers of a group.

Figure 17:
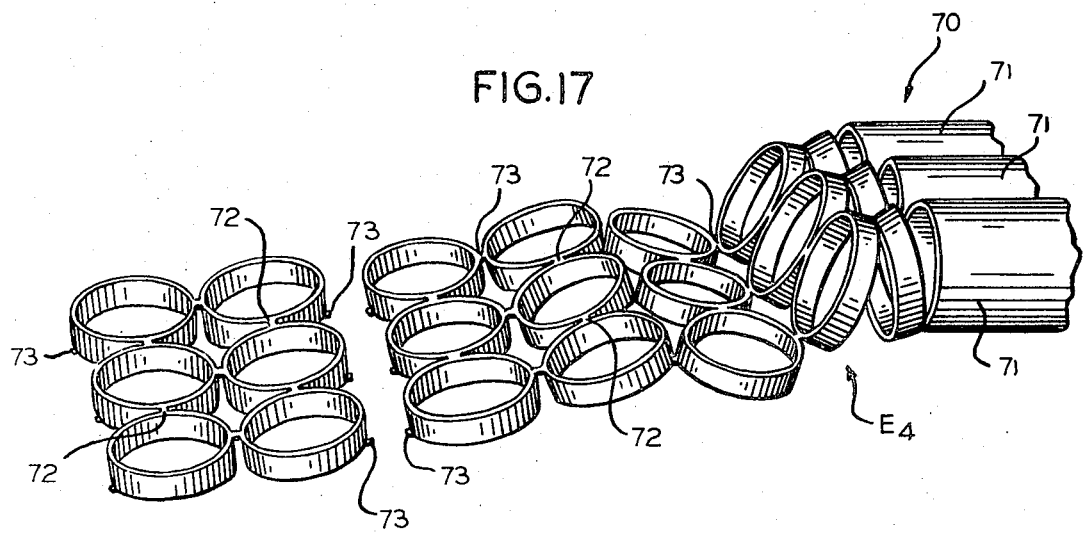
FIG. 17 is a view showing how an extrusion in the form of three conjugately connected tubes may be transversely severed to form a plurality of connected carriers.
Figure 18:
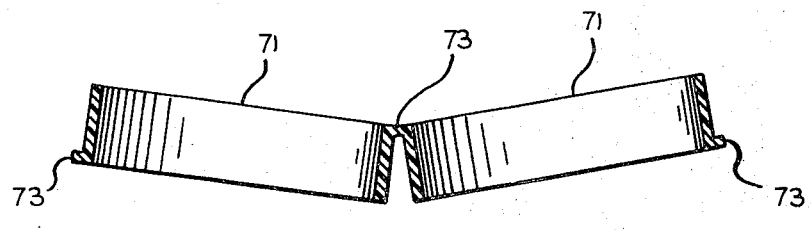
FIG. 18 is a view of the extrusion after being transversely severed.

Referring now to FIGS. 17 and 18 another embodiment is referred to by the reference numeral 70. As with the previous embodiments it is formed from an extrusion $E_4$ of a material having memory characteristics. It is comprised of tubes 71 conjugately connected by short webs 72. Extrusion $E_4$ is transversely severed to provide a connected group of carriers hinged together and adapted to be unfolded much in the fashion of extruding an accordion fold.

Extrusion $E_4$ is partially severed transversely alternately at the top and the bottom to provide connecting webs 73 which can be severed as desired to provide a discrete carrier as seen.

I claim:

1. The method of making a carrier consisting of a plurality of conjugately connected tube-like elements each adapted to embrace a unitary container of a group of containers comprising the steps of:
    a. continuously forming a web of flexible material comprising a plurality of tubes arranged in connected conjugate relationship;
    b. severing said conjugately connected tubes transversely into a group of connected tube-like elements, each being of a discrete length and having an axial dimension greatly less in extent than the axial dimension of a container;

c. placing said group with each discrete length of said tube-like elements about one of said group of containers;

d. fitting each of said tube-like elements about its associated container.

2. The method of claim 1 which includes the step of stretching said tube-like elements.

3. The method of claim 1 which includes the step of partially severing said tubes transversely thereof from alternate sides of said tubes.

4. The method of claim 1, wherein said connected tubes are formed by a continuous extruding operation;

5. The method of claim 1, wherein said connected tubes are formed by a continuous laminating operation.

6. The method according to claim 5 which includes the step of stretching said laminae prior to severing same.

7. The method of claim 5 which includes the step of stretching said laminae after severing same.

* * * * *